United States Patent Office 3,492,402
Patented Jan. 27, 1970

3,492,402
PYRETHROID INSECTICIDAL COMPOSITIONS CONTAINING AN EMULSIFIER AND A BACTERIO-FUNGISTAT
Griffin J. Baker, Edina, Minn., assignor to McLaughlin Gormley King Company, Minneapolis, Minn., a corporation of Minnesota
No Drawing. Continuation-in-part of abandoned application Ser. No. 494,870, Oct. 11, 1965. This application Feb. 1, 1967, Ser. No. 613,083
Int. Cl. A01m 9/24
U.S. Cl. 424—186      7 Claims

ABSTRACT OF THE DISCLOSURE

Insecticidal compositions containing a pyrethroid (optionally pyrethroid synergists), an emulsifier, a bacterio-fungistat and a carrier.

---

This application is a continuation-in-part of my co-pending application Ser. No. 494,870 filed Oct. 11, 1965, now abandoned.

This invention relates to improvements in insecticidal compositions.

Pyrethrum extracts or pyrethrins and similar pyrethroids such as allethrin and dimethrin have been used successfully in insecticidal compositions to combat a variety of insects. Likewise, it is quite common in the art to utilize synergists with the pyrethroids to increase their effectiveness and to achieve greater economy in the preparation of insecticidal compositions. Generally the insecticidal agents, that is the pyrethroid and pyrethroid synergists, are employed with a carrier such as a petroleum oil to form a concentrate which in ultimate use may be diluted with water.

Such pyrethroid concentrates generally exhibit disadvantages in that the concentrates themselves are usually not clear liquids and when diluted with water form a hazy or cloudy emulsion. It is desirable that the insecticide in use be a clear liquid. Moreover, the conventional pyrethroid concentrates when in the aqueous emulsion form are not suitably stable when subjected to low or elevated temperatures. Furthermore, the emulsions usually undergo microbiological deterioration and frequently growths of organisms are detected in the emulsions within relatively short periods of storage.

The present invention provides novel effective insecticidal compositions containing a pyrethroid, which compositions themselves are relatively clear and form in water a clear emulsion which remains stable at low and elevated temperatures and which are resistant to microbiological growth. As used throughout this application, the term "pyrethroid" embraces pyrethrins and other pyrethrum-like materials such as allethrin, dimethrin and the like.

Preferred insecticidal compositions of the invention are comprised of the following in the ranges specified for dilution in water, although it is to be understood that the components can be employed in amounts outside the specified ranges depending upon the intended use, dilution rate and so forth.

COMPOSITION I

| Component | Percent by weight | |
|---|---|---|
| | Broad range | Preferred |
| Pyrethroid | 0.5–4.5 | 2.0–3.0 |
| Piperonyl Butoxide (Pyrethroid Synergist) | 0–9.0 | 4.0–6.0 |
| N-octyl bicycloheptene dicarboximide (Pyrethroid Synergist) | 0–15.0 | 6.6–10.0 |
| Octylphenoxpoly (ethyleneoxy) ethanol | 40.0–90.0 | 60.0–75.0 |
| 6-Acetoxy-2,4-dimethyl-m-dioxane | 0.5–10.0 | 2.7–5.0 |
| Carrier | 3.5–57.0 | 10.0–16.0 |

COMPOSITION II

| Component | Percent by weight | |
|---|---|---|
| | Broad range | Preferred |
| Pyrethroid | 0.3–4.5 | 0.5–2.0 |
| Piperonyl butoxide (Pyrethroid Synergist) | 0.0–9.0 | 1.0–4.0 |
| N-octyl bicycloheptene dicarboximide (Pyrethroid Synergist) | 0.0–15.0 | 1.6–6.6 |
| Octylphenoxypoly (ethyleneoxy) ethanol | 15.0–90.0 | 20.0–30.0 |
| Isopropanol | 10.0–90.0 | 40.0–80.0 |
| Carrier | 2.5–15.0 | 3.0–10.0 |

The carrier can be any of the pyrethroid solvents such as naphtha, kerosene, lubricating oils of light viscosity, or heavier hydrocarbon oils, benzene and the like which are commonly employed in the art as bases for insecticidal compositions. The piperonyl butoxide and N-octyl bicycloheptene dicarboximide are pyrethrin synergists and one or the other or both can be omitted or replaced by other equivalent pyrethrin synergists, such as, for example, N-propyl isomer or sulfoxide and the like. The octylphenoxypoly (ethyleneoxy) ethanol is one of a series of emulsifying agents supplied commercially under the trademark "Igepal." The preferred emulsifier employed in the present compositions is Igepal CA–630 and is a nonionic, free flowing, slightly viscous liquid having a specific gravity of 1.06 to 1.07 at 25° C. The neutralization number of the material (mg. KOH per 1 gram sample to pH 7.0) is 0.5 maximum and its cloud point (1% solution in distilled water) is 63–67° C. The 6-acetoxy-2,4-dimethyl-m-dioxane is a bacterio-fungistat which is supplied commercially under the trademark "Dioxin." The isopropanol is also a bacterio fungistat.

The pyrethroid insecticidal compositions of the invention are admirably suited for use dilution with water to form a clear stable aqueous emulsion. Dilution rates can vary widely depending upon the intended insecticidal application. Thus, for example, a dilution of 1 part of composition I with 35 parts by weight of water is preferred for the control of household flying insects such as houseflies or mosquitoes. However, for control of insects affecting household and garden plants, such as aphids, cabbage worms, leaf rollers, white flies and so forth, the dilution rate is preferably 1 part of this concentrate with 500 to 1000 parts of water. However, for most household insecticidal applications 1 part by weight of composition I will be diluted with about 25 to 1000 parts by weight of water.

In use dilution of composition II it is preferred that the isopropanol be present in the final dilute composition in an amount of about 5.0% by weight.

One particularly preferred insecticidal composition of the invention has the following make-up:

Component: Percent by weight
Pyrethrins (pyrethrum extract) _____ 2.7
Piperonyl butoxide (pyrethrin synergist) ____ 5.4
N-octyl bicycloheptene dicarboximide _____ 9.0
Octylphenoxypoly (ethyleneoxy) ethanol ____ 66.4
6-acetoxy-2,4-dimethyl-m-dioxane _____ 3.6
Hydrocarbon oil carrier _____ 12.9

The above particularly preferred composition, identified as formulation X, was tested for its insecticidal effectiveness against houseflies by the standard Peet Grady test method at a dilution of 1 part of the concentrate to 35 parts water by weight. The insecticidal effectiveness is evidenced by the following comparison with the official test insecticide (OTI):

| Sample | Ave. Percent knockdown | | | Ave. percent kill, 24 hrs. |
|---|---|---|---|---|
| | 3' | 5' | 10' | |
| Formulation X | 20 | 50 | 92 | 92 |
| OTI | 88 | 91 | 94 | 52 |

In insecticidal tests against German cockroaches very good results are obtained in comparison to the official test insecticide. In those tests 1 part by weight of formulation X was diluted with 26 parts of water and the insecticides were sprayed directly on roaches with the following results:

| Direct roach spray results | Ave. percent dead and moribund | |
| --- | --- | --- |
| | 24 hrs. | 48 hrs. |
| Formulation X | 81 | 85 |
| OTI | 88 | 90 |

Another particularly preferred composition of the invention has the following make-up:

| Component: | Percent by weight |
| --- | --- |
| Pyrethrins | 0.983 |
| Piperonyl butoxide | 1.966 |
| N-octyl bicycloheptene dicarboximide | 3.275 |
| Petroleum distillate | 4.694 |
| Octylphenoxypoly (ethyleneoxy) ethanol | 25.448 |
| Isopropanol | 63.634 |

The above preferred composition, identified as formulation Y, was diluted with deionized water at a rate of 7.639% of the concentrate to 92.361% water by weight so as to result in the isopropanol content of the final dilute composition being approximately 4.86%.

Formulation Y in the dilution indicated was tested for insecticidal effectiveness against houseflies by the standard Peet Grady test method (Soap & Chemical Specialties Blue Book, 1964, p. 223–25). One sample of the diluted formulation $Y_1$ was stored in brown glass bottles at room temperature for one year prior to the test. Sample $Y_2$ was a fresh similarly diluted composition. The test results were as follows:

| Sample | Average percent knockdown, minutes | | | Average percent mortality, 24 hrs. |
| --- | --- | --- | --- | --- |
| | 3 | 5 | 10 | |
| OTI | 94 | 95 | 98 | 47 |
| Formulation $Y^1$ | 19 | 58 | 98 | 98 |
| Formulation $Y^2$ | 16 | 53 | 97 | 97 |

Sample $Y_1$ after one year storage was clear with no evidence of microbiological growth therein and possessed excellent insecticidal activity.

As previously indicated, not only are the compositions of the invention effective insecticides but they are unique with respect to clarity and stability. Conventional insecticidal compositions comprised of pyrethroids, pyrethroid synergists and carriers such as hydrocarbon oils commonly exhibit microbiological growth visible to the naked eye in such short periods as one month after preparation. In contrast, the compositions of the invention have been stored for considerably longer periods without evidence of any microbiological growth therein. Also, the compositions of the invention when diluted with water are relatively clear and evidence no deterioration of the pyrethroids after storage at room temperature in brown glass, or at 100° F. for extended periods. The compositions of the invention are thus adapted for dilution with water to form effective insecticidal sprays and the like.

I claim:
1. An insecticidal composition comprising from about 0.5% to 4.5% by weight of a pyrethroid, from about 40.0% to 90.0% by weight of the liquid nonionic octylphenoxypoly (ethyleneoxy) ethanol having a specific gravity of about 1.07 at 25° C., from about 0.5% to 10.0% by weight of 6-acetoxy-2,4-dimethyl-m-dioxane and from about 3.5% to 57.0% by weight of a pyrethroid solvent as a carrier therefor.

2. An insecticidal composition comprising from about 2.0% to 3.0% by weight of a pyrethroid, from about 4.0% to 6.0% by weight of piperonyl butoxide, from about 6.6% to 10.0% by weight of N-octyl bicycloheptene dicarboximide, from about 60.0% to 75.0% by weight of the liquid nonionic octylphenoxypoly (ethyleneoxy) ethanol having a specific gravity of about 1.07 at 25° C., from about 2.7% to 5.0% by weight of 6-acetoxy-2,4-dimethyl-m-dioxane and from about 10.0% to 16.0% by weight of a pyrethroid solvent as a carrier therefor.

3. An insecticidal composition comprising from about 0.3% to 4.5% by weight of a pyrethroid, from about 15.0% to 90.0% by weight of the liquid nonionic octylphenoxypoly (ethyleneoxy) ethanol having a specific gravity of about 1.07 at 25° C., from about 10.0% to 90.0% by weight of isopropanol and from about 2.5% to 15.0% by weight of a pyrethroid solvent as a carrier therefor.

4. An insecticidal composition comprising from about 0.5% to 2.0% by weight of a pyrethroid, from about 1.0% to 4.0% by weight of piperonyl butoxide, from about 1.6% to 6.6% by weight of N-octyl bicycloheptene dicarboximide, from about 20.0% to 30.0% by weight of the liquid nonionic octylphenoxypoly (ethyleneoxy) ethanol having a specific gravity of about 1.07 at 25° C., from about 40.0% to 80.0% by weight of isopropanol and from about 3.0% to 10.0% by weight of a pyrethroid solvent as a carrier therefor.

5. In the process of preparing an insecticidal composition which comprises incorporating a pyrethroid insecticide in a pyrethroid solvent, the improvement which consists in incorporating therein as an emulsifier the liquid nonionic octylphenoxypoly (ethyleneoxy) ethanol having a specific gravity of about 1.07 at 25° C., and a compound selected from the group consisting of isopropanol and 6-acetoxy-2,4-dimethyl-m-dioxane.

6. In the process of preparing an insecticidal composition which comprises incorporating a pyrethroid insecticide in a pyrethroid solvent, the improvement which consists in incorporating therein as an emulsifier the liquid nonionic octylphenoxypoly (ethyleneoxy) ethanol having a specific gravity of about 1.07 at 25° C. in an amount of from 15.0% to 90.0% by weight, and isopropanol in an amount of from 10.0% to 90.0% by weight.

7. In the process of preparing an insecticidal composition which comprises incorporating a pyrethroid insecticide in a pyrethroid solvent, the improvement which consists in incorporating therein as an emulsifier the liquid nonionic octylphenoxypoly (ethleneoxy) ethanol having a specific gravity of about 1.07 at 25° C. in an amount of from 15.0% to 90.0% by weight, and 6-acetoxy-2,4-dimethyl-m-dioxane in an amount of from 0.5% to 10.0% by weight.

References Cited

UNITED STATES PATENTS

| 2,755,218 | 7/1956 | Beroza | 167—33 |
| 2,990,320 | 6/1961 | Hartle et al. | 167—24 |
| 3,186,903 | 6/1965 | Soltes | 167—24 |

ALBERT T. MEYERS, Primary Examiner

D. M. STEPHENS, Assistant Examiner

U.S. Cl. X.R.

424—278, 341